United States Patent [19]

Struzina

[11] Patent Number: 4,765,642
[45] Date of Patent: Aug. 23, 1988

[54] STORABLE TRAILER

[76] Inventor: Richard J. Struzina, 3 Ascot Avenue, Nepean, Ontario, Canada, K2H 6E3

[21] Appl. No.: 28,701

[22] Filed: Mar. 20, 1987

[30] Foreign Application Priority Data

Jul. 31, 1984 [CA] Canada .................................. 460070

[51] Int. Cl.4 .............................................. B62B 1/04
[52] U.S. Cl. ................................. 280/656; 280/43.24; 280/641; 280/645
[58] Field of Search ................. 280/656, 639, 40, 641, 280/645, 63, 43.24, 401; 114/344

[56] References Cited

U.S. PATENT DOCUMENTS

| 2,110,944 | 3/1938 | Schultz | 280/40 |
| 2,469,506 | 5/1949 | Kerr et al. | 280/40 |
| 2,495,449 | 1/1950 | Francis | 280/43.18 |
| 2,610,865 | 9/1952 | Cantrell | 280/43.18 |
| 2,774,606 | 12/1956 | Burweger et al. | 280/43.18 |
| 2,806,710 | 9/1957 | Mascaro | 280/43.23 |
| 2,809,046 | 10/1957 | Andersson | 280/639 |
| 2,809,048 | 10/1957 | Kytola | 280/43.18 |
| 2,869,887 | 1/1959 | Westberg | 280/43.23 |
| 2,885,216 | 5/1959 | Browning | 280/656 |
| 3,367,675 | 2/1968 | Gearin | 280/656 |
| 4,480,851 | 11/1984 | St. Pierre | 280/656 |

FOREIGN PATENT DOCUMENTS

447088  3/1948  Canada .

Primary Examiner—John J. Love
Assistant Examiner—Eric Culbreth
Attorney, Agent, or Firm—Pascal & Associates

[57] ABSTRACT

A vertically storable trailer embodying a flat, triangular frame has mounted thereon a container bottom for receiving a load and a container top that is sealingly and lockably engageable with the bottom for securely enclosing the load. The top and bottom have outwardly sloping forward and side walls to permit nestably storing the top in an inverted position within the bottom to reduce trailer storage space and a rearwardly facing flat end wall of the bottom is normal to the frame to facilitate tilting the trailer thereon to reduce floor storage area requirements. Wheel suspension assemblies include a pair of tubes, one end of each tube being pendulously attached to the frame adjacent either side of the container bottom. A wheel is rotatably journalled to an axle affixed to each tube adjacent its free end and within the free end is mounted a shock-absorbing resilient load sustaining unit. A suspension support is pivotally attached to the frame on either side of the container bottom in releasably engageable relation with a bearing of each load sustaining unit for locking same in an operable position to provide ground engagement of the wheel with a predetermined road clearance and releasing the locked load sustaining unit automatically by means of a ground contacting pushrod when the trailer is tilted onto the end wall. When released, the suspension assemblies swing inwardly of the frame to minimize trailer storage space.

33 Claims, 11 Drawing Sheets

STORABLE TRAILER

This application is a continuation-in-part application of Ser. No. 739,050 filed May 29, 1985.

BACKGROUND OF THE INVENTION

This invention relates generally to a two-wheeled trailer and more particularly to a small, lightweight trailer that serves as an auxiliary trunk for an automobile and that is storable in a small space when not in use.

An expansion of the trunk space of an automobile requires a sealable and lockable container to protect a load therein from the elements and from damage or loss caused by vandalism. While trailers with such containers are generally available, the demand for them is low due to the fact that it is difficult to store them when not in use.

Trailers that can be folded to minimize storage space are disclosed in Canadian Pat. No. 447,088 issued on Mar. 9, 1948 to E. Koller and in U.S. Pat. No. 2,469,506 issued on May 10, 1949 to K. Kerr et al. However, these trailers cannot serve as automobile auxiliary trunks since they do not provide the load with protection from the elements and vandalism. In addition, the absence of shockabsorbing springs results in the load being subjected to road shock which is unacceptable to loads of the type generally stored in automobile trunks.

A combination trunk and trailer is disclosed in U.S. Pat. No. 2,110,944 issued on Mar. 15, 1938 to F. C. Schultz. While this invention provides a sealable automobile trunk that can be converted to a trailer, it is clearly not intended to serve as a trunk in its trailer configuration. Nor is it intended to be stored separately from the automobile when not in use. In addition, the absence of shock-absorbing springs makes the trailer configuration unacceptable for loads of the type generally stored in automobile trunks.

The trailers disclosed in U.S. Pat. Nos. 2,809,046 issued on Oct. 8, 1957 to B. A. Anderson and 3,367,675 issued on Feb. 6, 1968 to D. C. Gearin relate to foldable, single wheel trailers, although they are not intended to be stored separately from the automobile when not in use. Neither do they protect the load from the elements nor from vandalism.

Adjustable wheels on trailers as disclosed in U.S. Pat. Nos. 2,806,710 issued on Sept. 17, 1957 to D. C. Mascaro, 2,864,626 issued on Dec. 16, 1958 to S. J. Schantz, 2,869,887 issued on Jan. 20, 1959 to H. A. Westberg, and 2,885,216 issued on May 5, 1959 to J. W. Drowning provide the capability of retracting the suspension means. This is done, however, with power from external sources via cables, levers and hydraulics and is solely for the purpose of lifting and lowering the trailer and its load. While these inventions disclose collapsing wheel suspension means, they are generally complicated and do not provide freely moving and self-collapsing means for minimizing trailer storage space requirements.

Load lifting and lowering features are coupled with suspension springs and release mechanisms in trailers disclosed in U.S. Pat. Nos. 2,485,448 issued on Jan. 24, 1950 to G. C. Francis, 2,610,865 issued on Sept. 16, 1952 to O. L. Cantrell, 2,774,606 issued on Dec. 18, 1956 to L. Burweger et al, and 2,809,048 issued on Oct. 8, 1957 to L. V. Kytola. Since the purpose of the suspension springs and release mechanisms is solely to facilitate the lifting and lowering of loads, features for minimizing storage space are not disclosed. In particular, the sizes of suspension mechanisms and the volumes swept by them during retraction are large. This is prevalent because wheels and frames are large and the free ends of the springs move to a position above the top of the wheels. Moreover, shackles, hooks and crankarms, that normally hold the free ends of the springs, are pivoted below the bottom of the springs. While these deficiencies are not generally relevant to lifting and lowering mechanisms, they are very important in collapsible trailers for which minimal storage space is a prime requirement.

SUMMARY OF THE INVENTION

A principal objective of the present invention is to overcome the problems and shortcomings of the prior art by providing a trailer which can serve as an automobile auxiliary trunk that protects its load from the elements, vandalism and road shock encountered by the wheels.

Another objective of the invention is the provision of a trailer that is readily collapsible, easily storable and which requires but a small storage space. Such a trailer meets present needs in that expansion of automobile trunk space becomes necessary with the advent of small, compact automobiles and in that storage of such a trailer, together with an automobile, within the confines of a common home garage becomes mandatory in high density housing developments.

Yet another objective of the invention is the provision of a trailer that is simple in design and construction and which is easy to manufacture.

Still another objective of the invention is the provision of a trailer that requires no tools or special skills to operate and store.

The problems associated with the prior art may be substantially overcome and the aforenoted objectives achieved by recourse to the present invention which comprises, in combination, frame means for supportably carrying a load, including attachment means connectable to a trailer hitch of a towing vehicle, container means having a bottom portion mounted on the frame means for receiving the load and a top portion sealingly and lockably engageable with the bottom portion for securely enclosing the load, the bottom portion having an end wall adapted to vertically support the trailer in a stored position and both portions being nestable to reduce trailer storage space, wheel suspension means pendulously attached to the frame means adjacent the bottom portion, wheel means rotatably journalled to the suspension means and suspension support means movably attached to the frame means adjacent the bottom portion in releasably engageable relation with the suspension means for locking same in an operable position to provide ground engagement of the wheel means with a predetermined road clearance and releasing the locked suspension means in the vertically supported position, whereby the wheel means swing inwardly of the frame means to minimize trailer storage space.

BRIEF DESCRIPTION OF THE DRAWINGS

The invention will now be more particularly described with reference to embodiments thereof shown, by way of example, in the accompanying drawings in which.

It should be noted that as a convention, when referring to the top, bottom or sides of the trailer, these terms should be construed as the top, bottom or sides of the trailer while in its normal horizontal position with its wheels in contact with the ground. Thus when the trailer is standing on its end, the top of the trailer is in a vertical plane.

DESCRIPTION OF THE PREFERRED EMBODIMENTS

Figure 1:
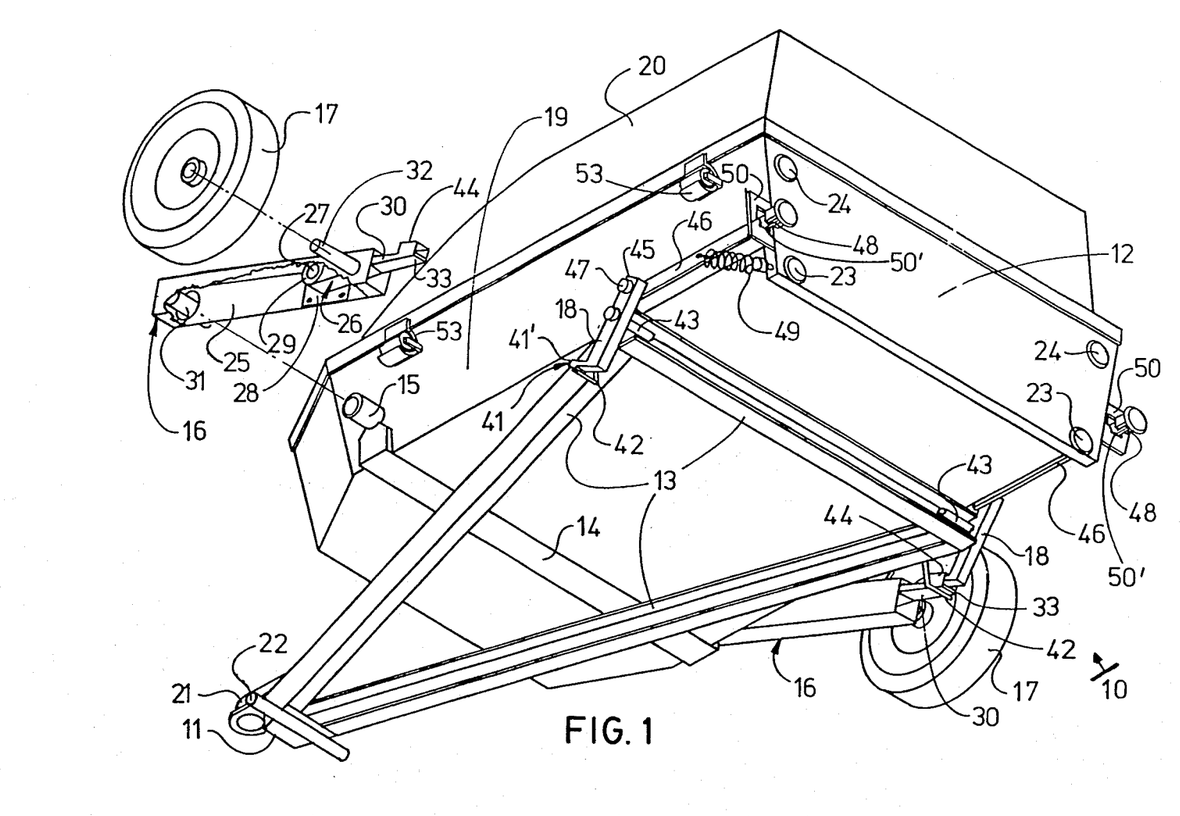
FIG. 1 is a bottom perspective view of a trailer in accordance with the present invention showing an exploded and cut-away view of a suspension assembly and wheel.

Referring now more particularly to the accompanying drawings, where like and corresponding parts are designated by similar reference characters, there is illustrated an embodiment of the invention, generally designated as a trailer 10 having a forward end 11 and a rearward end 12. The main components of the trailer are a triangular frame 13, a cross-member 14 with a pair of pivot housings 15, a pair of independent suspension assemblies, generally designated 16, pivotally attached to the cross-member 14 by means of the pivot housings 15, a pair of wheels 17 journalled to the suspension assemblies 16, a pair of suspension supports 18 pivotally attached to the frame 13, a container bottom 19 fixedly attached to the frame 13 and a container top 20 sealingly and removably attached to the container bottom 19.

The frame 13 extends forwardly of the container bottom 19 to the forward end 11 and has at its apex, attachment means 21 for hitching the trailer 10 to a conventional ball hitching element (not shown) mounted at the rear of a towing vehicle such as an automobile. Lifting means comprising a rod 22, suitably connected to the forward end 11 as by arc welding, provides a pair of handles at the forward apex of the frame 13 to facilitate manual lifting of the forward end 11 of the trailer 10 from its horizontal, or operating position, (FIG. 2) to its vertical, or storing position,- (FIG. 3)

Storing supports 23 and 24, consisting of hard rubber like material, are mounted on the container bottom 19 at the rearward end 12. These supports provide means for maintaining the trailer 10 in its vertical position, as shown in FIG. 3.

Figures 3, 4, 5, 7, 9:
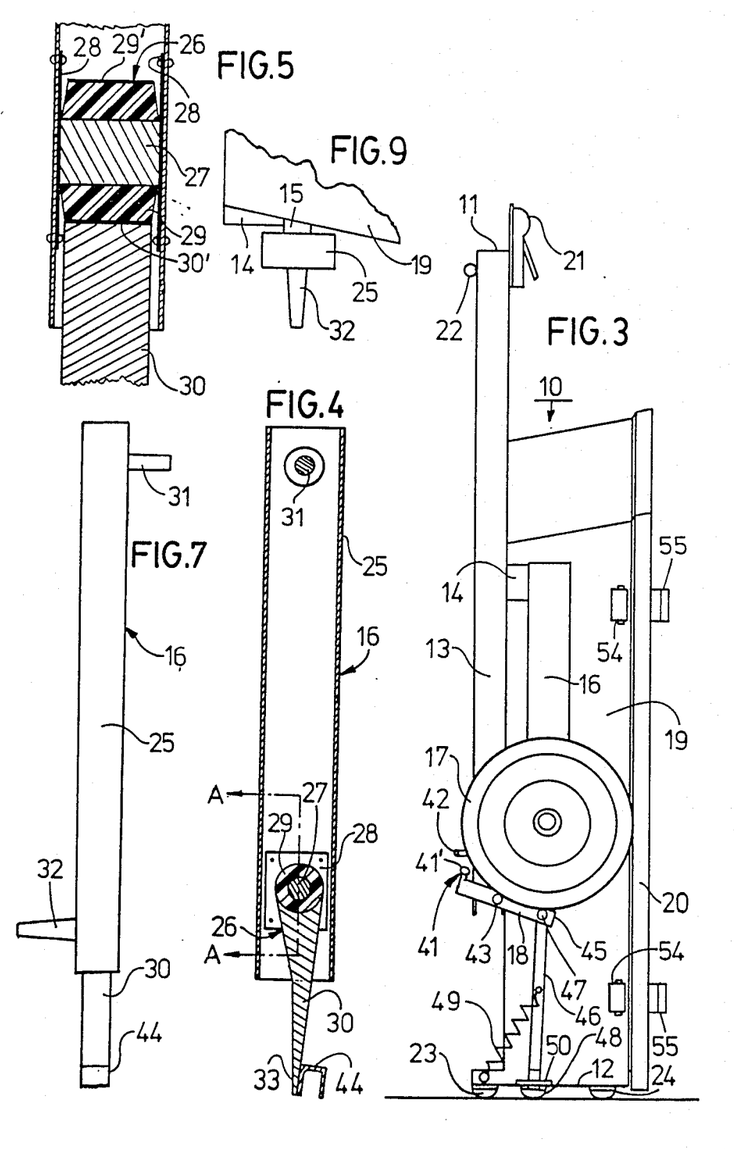
FIG. 3 is a side elevation view of the trailer of FIG. 1 in a vertical or storing position.
FIG. 4 is a side sectional view of the suspension assembly of FIG. 1 in a stored configuration.
FIG. 5 is a fragmentary sectional view of the suspension assembly of FIG. 4 taken along the lines A—A showing a load sustaining unit which is based on a cylindrical resilient rubber bushing material.
FIG. 7, appearing with FIG. 3, is a side elevation view of the suspension assembly of FIG. 1 in its stored position.
FIG. 9, appearing with FIG. 3, is an end view of the suspension assembly of FIG. 3 and a fragmentary end view of a container bottom of the trailer.

Referring next to FIG. 4, a suspension assembly 16 is shown to comprise a rectangular cross-section suspension tube 25 which contains a shock-absorbing resilient load sustaining unit 26 comprising a fixed cylindrical steel shaft 27, welded at both ends, to a pair of mounting plates 28 which, in turn, are riveted or bolted to the tube 25. It will be understood from FIG. 4 and FIG. 5 that the shaft 27 has fixedly and concentrically attached to its external cylindrical surface a thick-walled bushing 29 consisting of resilient material, such as rubber, which in turn is fixedly and concentrically attached at its external cylindrical surface 29' to a corresponding internal cylindrical surface 30' of the suspension arm 30. A free end 33 of the suspension arm 30 protrudes beyond the end of the suspension tube 25 and is restrained from rotating freely about the shaft 27 by torsional resistive forces within the bushing 29.

Figures 6, 16, 17, 18:
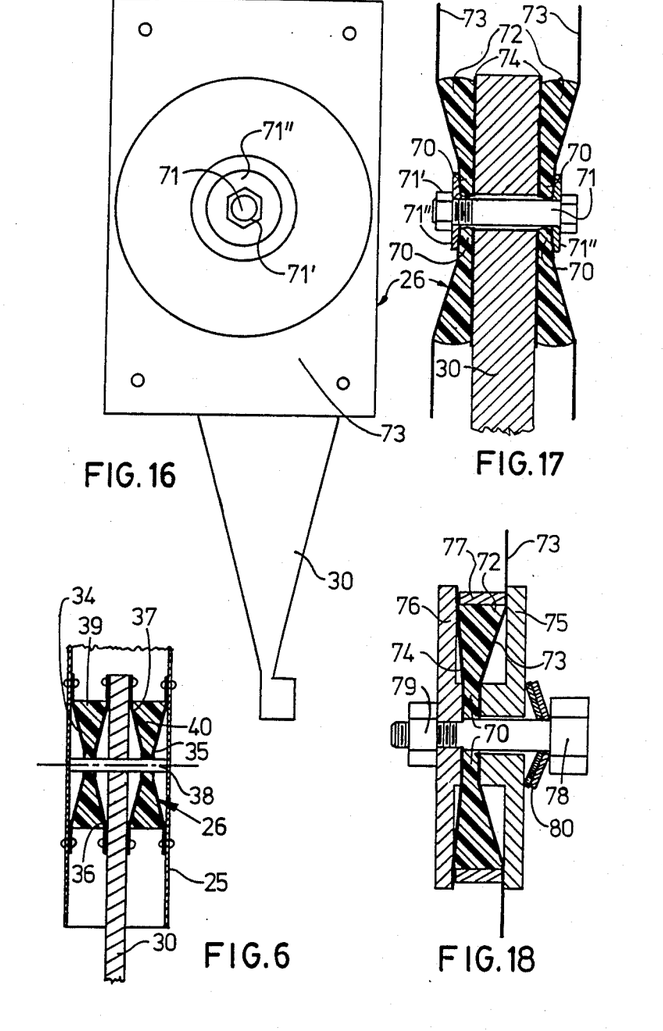
FIG. 6 is a fragmentary sectional view of the suspension assembly of FIG. 4 taken along the lines A—A showing a load sustaining unit based on conically shaped torsion plates as attachment surfaces for the bushing material.
FIG. 16, appearing with FIG. 6, is a side elevation view of another embodiment of a load sustaining unit based on conically shaped torsion plates as attachment surfaces for the bushing material.
FIG. 17 is a fragmentary sectional view of the embodiment of a load sustaining unit in FIG. 16 based on conically shaped torsion plates as attachment surfaces for the bushing material.
FIG. 18 is a sectional view of apparatus for practicing a method of manufacturing an improved load sustaining unit based on conically shaped torsion plates as attachment surfaces for the bushing material.

A second embodiment of the load sustaining unit 26 is shown in FIG. 6. Two identical conically shaped torsion plates, 34 and 35, formed from sheet steel, are riveted or bolted to interior side wall surfaces of the tube 25. A second set of identical conically shaped torsion plates 36 and 37 are riveted or bolted to the arm 30 while a pivot shaft 38 maintains the conically shaped plates concentric. Intermediate the pairs of plates 34, 36 and 35, 37, a pair of torsion washers 39 and 40, fabricated from a resilient material such as rubber, are fixedly attached to the facing surfaces thersof. Torsional forces generated by the suspension arm 30 are transmitted via the plates 36 and 37 to the washers 38 and 40 creating evenly distributed internal strain and stress. This provides the torsional forces that resist rotation of the arm 30 about the shaft 38.

Figures 2, 19:
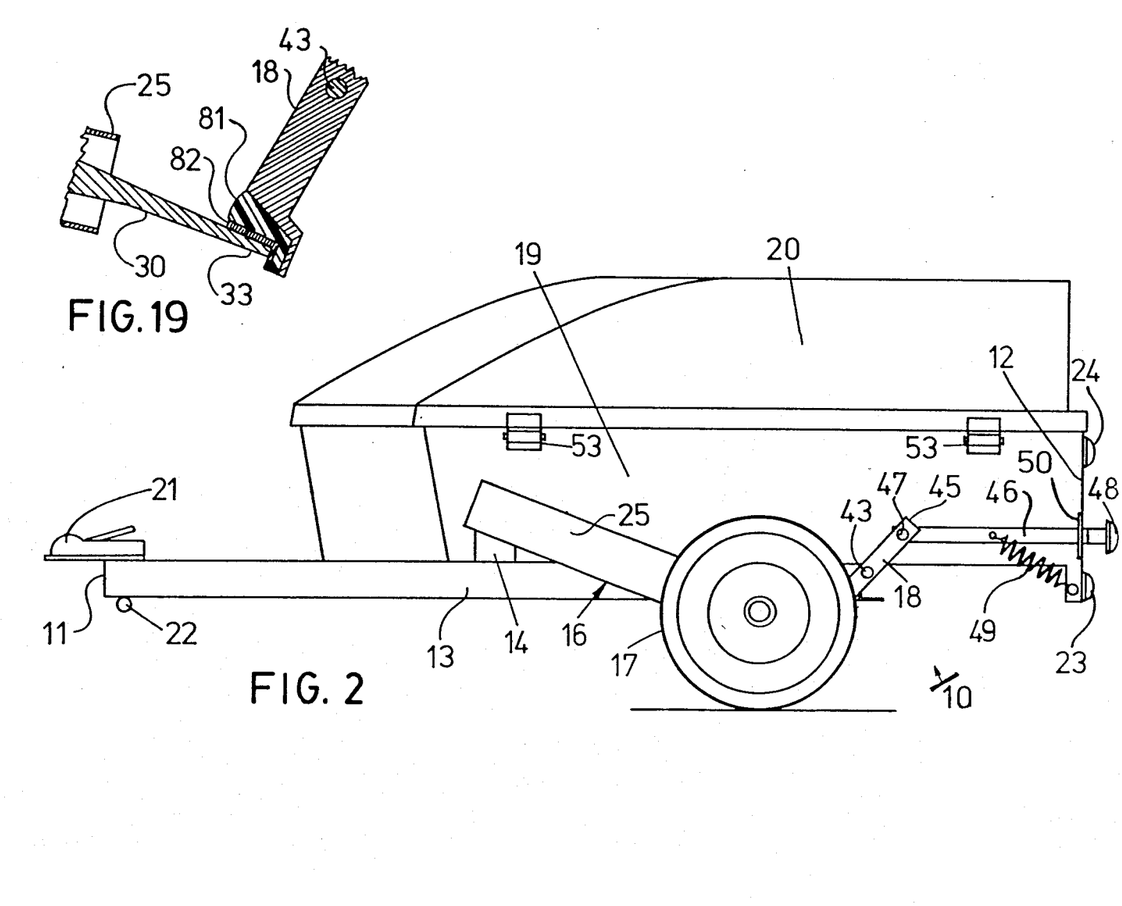
FIG. 2 is a side elevation view of the trailer of FIG. 1 in a horizontal or operating position.
FIG. 19, appearing with FIG. 2, is a fragmentary sectional view of another embodiment of an interface between the suspension support and the free end of a suspension arm shown in FIG. 8.
Figure 8:
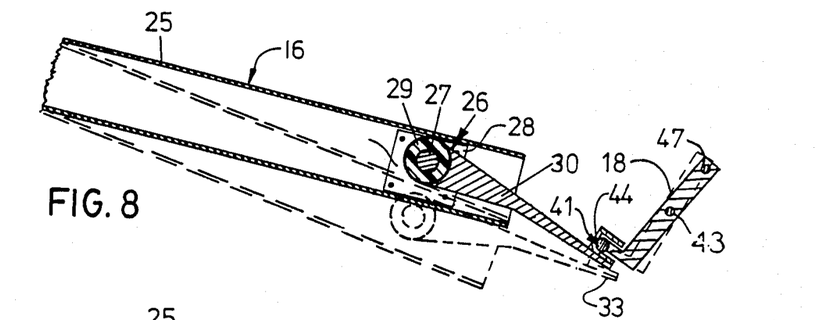
FIG. 8 is a partial view of the suspension assembly of FIG. 4 shown operatively engaging a suspension support in both a loaded and unloaded operating position.

The location of the unit 26 inside the tube 25 produces a slender suspension assembly, as shown in FIGS. 7 and 9, thereby minimizing the space between the wheel 17 and the container bottom 19. As shown in FIG. 4, the free end 33 of the arm 30 does not extend laterally beyond the longitudinal extension of the envelope of the tube 25 in its unloaded storing configuration, thereby allowing collapsing of the assembly 16 to a vertical position as shown in FIG. 3. This configuration of the assembly 16 is achieved by having a long suspension tube 25 which maintains a relatively small angle of incline in the operating position of the trailer as shown in FIG. 2 and FIG. 8 thereby maintaining the required road clearance of the free end 33 in its loaded operating position shown in FIG. 8 in broken line form.

The significance of the slender feature of the assembly 16 is shown in FIG. 9 which depicts the location of the assembly relative to the outwardly sloped will of the container bottom 19. Any protrusion of the unit 26 beyond the longitudinal envelope of the suspension tube 25 would directly increase the storage space required for the trailer.

The slender suspension tube 25 provides the following functions:

a crank to allow movement of the wheel due to changes in load and due to road obstructions;

a crank to allow movement for collapsing the suspension assembly;

a housing for the load sustaining unit; and a thin-walled structural box member for efficiently resisting longitudinal torsional forces created by the absence of a full wheel to wheel axle.

A shaft 31, being fixedly attached to a side wall of the tube 25 near the forward most end thereof and projecting inwardly, mates with the outwardly projecting pivot housing 15 to produce a compact pivotal connection for the assembly 16, without the pivotal connection protruding significantly into the inner space of the container bottom 19. A horizontally disposed axle 32 projecting outwardly from the outer wall of the tube 25, near the rearward most end, provides a journalled connection for the wheel 17.

When the trailer 10 is in the horizontal operating position, the free end 33 of the arm 30, protruding from the tube 25 at its rearward most end, is held from rotational displacement about the shaft 31 by a supporting end 41 of the support 18 at the top and by a retaining support 42 at the bottom. Longitudinal or lengthwise movement of the free end 33 resulting from load changes on the assembly 16 is allowed by pivotal movements of the support 18 about a pivot shaft 43 which is fixedly attached to the frame 13.

The supporting end 41 consists of a cylindrically shaped steel bearing shaft 41' welded along an edge of an L-shaped forward extension of the support 18. The end 41 couples with a curvilinear lining of a bearing 44 located at the free end 33. The lining is fabricated of nylon or other, similar, low friction, low wearing material. As shown in FIG. 4, one side of the bearing 44 is cut away to provide an opening for decoupling of the end 41. This novel method for coupling and decoupling the arm 30 protects the bearing surfaces from road dirt by positioning the opening to the bearing 44 so that it opens towards the rearward end 12 of the trailer. Dirt being thrown into the air by the bottom half section of the wheel 17 will have one component of its relative velocity vector directed rearward, thereby preventing entry of dirt into the bearing opening, it being located at a level below the centre of the wheel 17.

As shown in FIG. 8, the length of the support 18 from the shaft 43 to the supporting end 41 is such that the angle of rotational displacement of the support 18 about the shaft 43, caused by longitudinal or lengthwise movement of the free end 33, is similar to the angle of change in incline of the arm 30, thereby minimizing rotational movement, and friction between the supporting end 41 and the bearing 44. As shown in FIG. 8, this novel mechanism also ensures that the angle between the support 18 and the arm 30 is always greater than 90 degrees, thereby maintaining a stable condition in which the supporting end 41 of the support 18 stays coupled to the free end 33 and requires no external holding mechanism.

This arrangement of the support 18 also eliminates the requirement for pivoting the support 18 below the level of the suspension arm 30. This increases ground clearance of the trailer in the operating position and decreases the horizontal storage space of the trailer in the storing position.

The function of the retaining support 42 is necessary on all trailers traveling at high speed, especially trailers with small wheels. On each side of the trailer 10, the support 42 reduces high amplitude, low frequency oscillation of the load and protects the arm 30 and the support 18 from damage due to continual hammering resulting from returns of the wheel 17 and the arm 30 from large excursions caused by large depressions in the roadway.

An actioning end 45 of the support 18 has a rotational relationship with a pushrod 46 by means of a pivot 47. A longitudinal, linear displacement of the pushrod 46 is generated by a force on an extension 48 of the pushrod 46 which extends beyond the rearward end 12, as the trailer 10 is pivoted from the horizontal position to the vertical position by manually lifting and pivoting the rod 22 about the storing supports 23. The linear displacement of the pushrod 46 produces a rotational displacement of the suspension support 18 about the shaft 43 such that the supporting end 41 moves rearward beyond the free end 33, thus allowing the arm 30 and the assembly 16 rotational displacement about the shaft 31. The force for the rotational displacement of the suspension assembly 16 on each side of the trailer 10 is provided by gravity which develops a pendular action on the assembly 16 and wheel 17 about the shaft 31. The final collapsed position of the assembly 16 and the wheel 17 is attained when the trailer 10 is in the vertical position shown in FIG. 3. Similarly, as the trailer 10 is pivoted from the vertical to the horizontal position, the assembly 16 and the wheel 17 are pivoted on the shaft 31 by pendular action until the free end 33 engages the support 42. The supporting end 41 of the support 18 then moves forward on top of the arm 30 to hold the free end 33 from free rotational displacement about the shaft 31. The force for this action is obtained from the pushrod 46 which is displaced rearwardly by a combination of a gravitational force and a returning force developed by a spring 49. The action of restoring the trailer 10 to its operating configuration is now complete and further pivoting of the trailer about the supports 23 transfers the weight of the trailer 10 onto the wheels 17, the assemblies 16, the arms 30 and the suspension supports 18.

A stepwise increase in cross-section of the pushrod 46 near its rearward most end 48 provides a locking facility to prevent accidental actuation of the pushrod 46 when the trailer 10 is in the horizontal position. The locking action is achieved by the stepwise decrease in cross-section of the rearward most end 48 of the pushrod 46 dropping into a notch 50' of a sliding bearing 50 when the trailer 10 is pivoted to the horizontal position. The force for this downward motion is obtained from a combination of the gravitational force acting on the pushrod 46 and the spring force developed by the spring 49 acting on the rear of the pushrod 46. It should be noted that the spring 49 is positioned angularly to the pushrod 46, thereby providing both longitudinal and lateral forces.

When pivoting the trailer 10 about the supports 23 from the operating position to the storing position, the rearward most end 48 of the pushrod 46 is first lifted out of the notch 50' and is then moved with a longitudinal linear sliding displacement through the bearing 50.

Figures 10, 11, 14, 15:
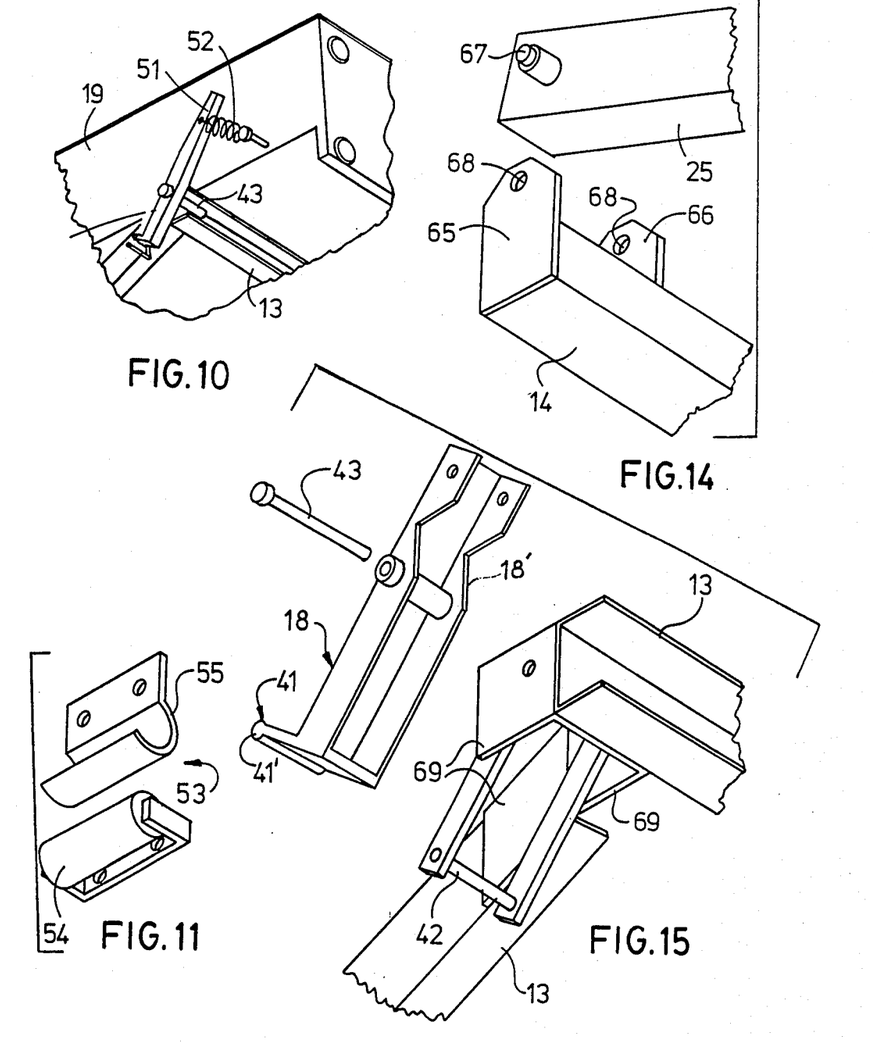
FIG. 10 is a fragmentary bottom perspective view of a second embodiment of the suspension support of the present invention.
FIG. 11 is a bottom perspective view of a disconnecting hinge.
FIG. 14 is a fragmentary bottom perspective view of a disassembled suspension assembly pivot shaft support.
FIG. 15 is a disassembled, fragmentary bottom perspective view of another embodiment of the suspension support.

Referring to FIG. 10, a second embodiment of the suspension support actuation mechanism of this invention comprises an extension to the support 18 to form a lever arm 51 which serves as a handle for manually collapsing the assembly 16. A spring 52 holds the lever arm 51 in the rearward position while the trailer 10 is in the operating position. When the trailer 10 is in the storing position, a force applied manually on the lever arm 51 elongates the spring 52, moves the supporting end 41 rearwardly and releases the arm 30 to allow the assembly 16 to pendulate to a vertical position.

To return the trailer 10 to the operating position, it is pivoted about the supports 23 thereby also inducing a pendular pivoting action on the assemblies 16. The supporting end 41 is pushed rearward by the arm 30 which snaps back into its operating position when the free end 33 engages the support 42.

The embodiment of FIG. 10, therefore, provides a simpler but not fully automatic suspension collapsing mechanism.

The container top 20 is attached to the container bottom 19 by a pair of disconnectable hinge assemblies, generally designated 53, which are shown in FIG. 11 mounted on one side of the top 20 and bottom 19. A lock (not shown) on the other side of the top 20 and bottom 19 permits sealingly positioning the container top 20 onto the container bottom 19 to form a secure, lockable weathertight enclosure for the load.

Referring to FIG. 11, it will be observed that the assembly 53 comprises a hinge pivot shaft 54 that fits into a hinge housing 55 which is open on one side of its generally cylindrical body. By pivoting the container top 20 beyond its normal 90 degrees opening range, the hinge pivot housing 55 can be disconnected from the hinge pivot shaft 54 as shown in FIG. 11.

The container bottom 19 and container top 20 have outwardly sloping side walls such that the inverted container top 20 fits into the container bottom 19. The wall at the rearward end 12 of the container bottom 19 is perpendicular to the frame 13 to facilitate standing the trailer 10 on the supports 23 and 24 in the storing position. The container top 20 has a high sloped forward end to minimize wind resistance when the trailer 10 is towed and to provide clearance for the intrusion of the member 14 and housings 15 when the container top 20 is nested with the container bottom 19 as when storing the trailer. These features allow storage of the container top 20 inside the container bottom 19 which halves the total storage space normally required by the assembled container assembly.

Figure 12:
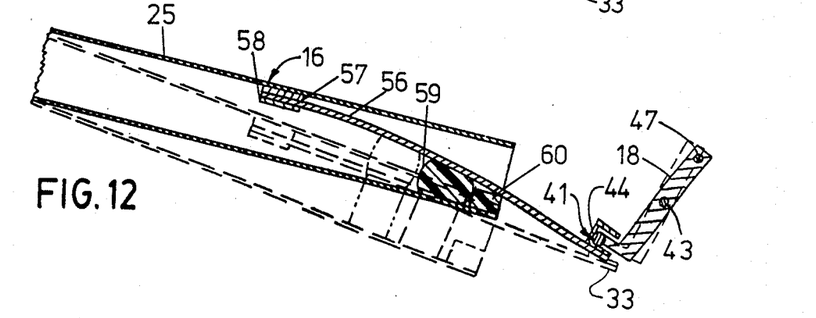
FIG. 12, appearing with FIG. 8, is a side sectional view of another embodiment of the suspension assembly showing a hybrid load sustaining device.
Figure 13:
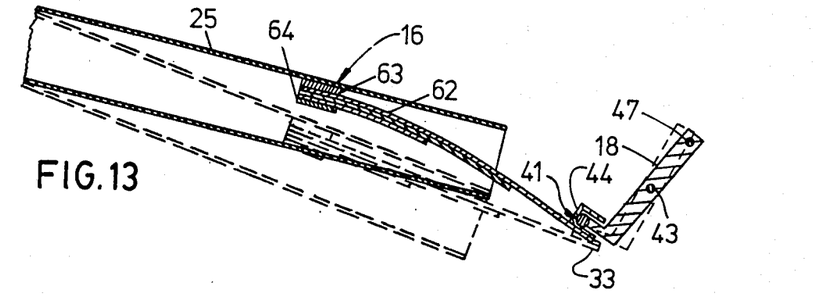
FIG. 13 is a side sectional view of yet another embodiment of the suspension assembly showing a multi-leaf cantilever spring.

While the preferred embodiment of the assembly 16 contains a load sustaining unit based on torsional loading of a resilient material such as rubber, other forms of load sustaining devices are shown in FIG. 12 and FIG. 13. The configuration shown in FIG. 12 comprises a hybrid load sustaining device consisting of a flat, single leaf, cantilever spring 56 made of steel or fiberglass reinforced epoxy resin material, fixedly attached to an inner surface of a side wall of the tube 25 by retaining plates 57 and 58, at least one first resilient supporting cushion 59 made of rubber and a second cushion 80 also made of rubber. This is a highly efficient arrangement in which the spring 56 is stressed uniformly from its anchorage at the plates 57 and 58 to its support by the cushion 59. Such uniform stressing of a flat spring is not possible in prior art designs and allows the use of minimal spring material to achieve the required load sustaining forces. The cushion 60, being located closer to the spring free end 33, prevents overloading of the spring 56 by reducing the moment arm through which the force acts on the spring on large excursions.

The configuration shown in FIG. 13 comprises a multileaf cantilever spring 62 made of steel or fiberglass reinforced epoxy resin material fixedly attached to the tube 25 by retaining plates 63 and 64.

Although the preferred embodiment of this invention has been described with pivotal bearings based on cantilevered pivot shafts that support the assembly 16 and the support 18, these can also comprise pivotal bearings based on simply supported pivot shafts as shown in FIG. 14 and FIG. 15.

Plates 65 and 66, shown in FIG. 14, are fixedly attached to an extension of the cross-member 14 and provide the bearing surface for a shaft 67 which extends on both sides of the tube 25 through apertures 68.

In FIG. 15 the support 18, shown as a channel 18', is pivoted on the shaft 43 which is supported by a bracket 69. The bracket 69 is fixedly attached to an extension of the rearward member of the frame 13 and performs the additional function of interconnecting the members of the frame 13 and attachment means for the support 42. The support 42 is also based on a structure of a simply supported crossmember.

In FIG. 16 and FIG. 17 there is shown another embodiment of the load sustaining unit 26 based on the principle of conical plates shown in FIG. 6. This embodiment avoids the shaft 38 and comprises, in part, a pair of thin, circular rubber torsion washers 72 between which the arm 30 is sandwiched. The washers 72 provide high, linear, evenly distributed shear forces to hold the arm 30 in place without requiring the shaft 38. A simple thrust bolt 71, nut 71' and two washers 71" provide lateral compression of the washers 72 via torsion plates 73 and 74 which are made of sheet steel. The pressure thus generated on the rubber-to-metal interface of the washers 72 and the plates 73 and 74 improves the anchoring qualities of the bond at each interface.

FIG. 18 shows apparatus that may be employed for manufacturing the rubber and torsion plate sandwich of the load sustaining unit of FIG. 17. The method incorporates a tooling plate 75, which holds the preformed, conically shaped torsion plate 73 in its preformed configuration and a tooling plate 76 which distorts the flat torsion plate 74 to decrease the thickness of the washer 72 cavity at a central section 70 in inverse proportion to the basic thickness of the cavity. The maximum thickness of the cavity is defined by a removable cylindrical cavity wall 77 which spaces the plates 73 and 74 apart. The required force for distorting the plate 74 is supplied by a thrust bolt assembly consisting of a bolt 78, a nut 79 and Belleville springs 80. After injection molding of the rubber, two identical rubber and torsion plate sandwiches are assembled onto the arm 30 by bonding two of the plates 74 to the suspension arm 30, using a structural adhesive, and by applying pressure by means of the thrust bolt 71, nut 71' and the two washers 71". This process flattens the torsion plates 74 thereby providing constant pressure over the whole surface of each section 72 and also compensating for molding shrinkage of the rubber. The completed unit 26 is then riveted or bolted to a pair of facing side walls inside the tube 25.

In FIG. 19 there is shown a sectional view of a second embodiment of the interface between the support 18 and the free end 33 of the arm 30. This interface is based on a flexible bearing comprising a resilient L-shaped block 81, made of rubber-like material, which is bonded to the support 18 on one side and to an L-shaped metal striker plate 82 on the other side. The free end 33 meets the plate 82 and maintains full contact with it over the range of relative angular displacements between the arm 30 and the support 18. This novel bearing arrangement eliminates relative movements and frictional wear between the free end 33 and the support 18. In addition, since there is always full surface to surface contact between the free end 33 and the striker plate 82, collection of road dirt at this interface is minimized.

Figure 20:
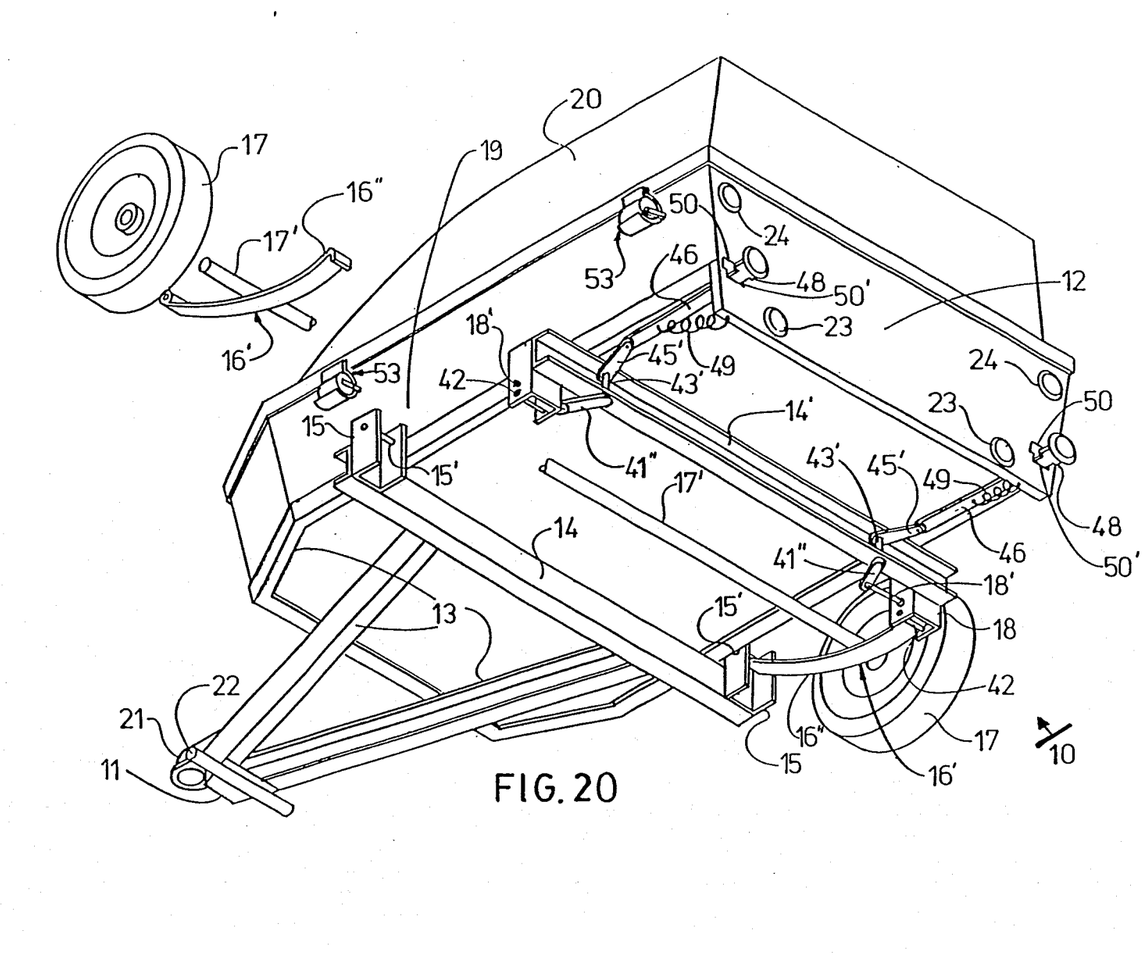
FIG. 20 is a bottom perspective view of the trailer with a leaf sPring suspension assembly.
Figure 21:
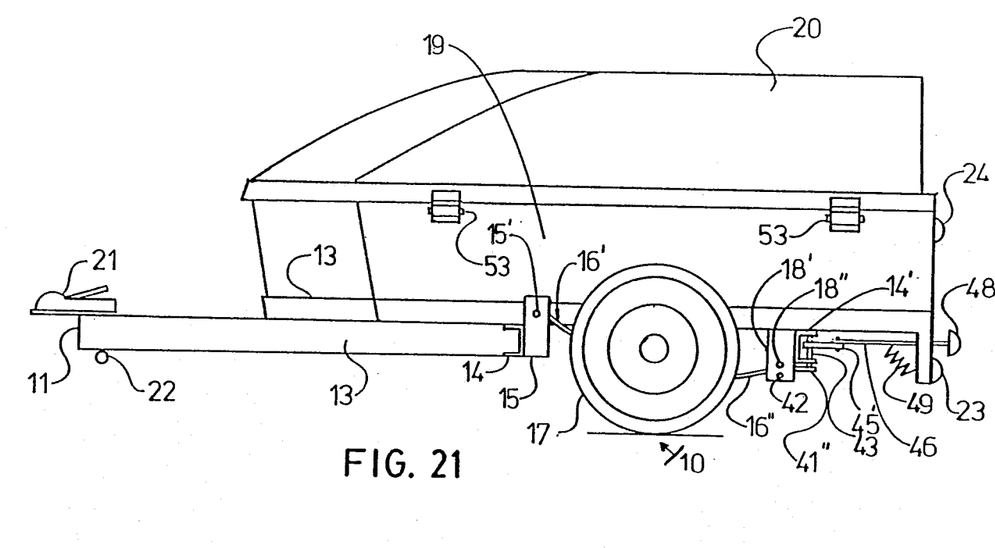
FIG. 21 is a side elevation view of the trailer of FIG. 20 in a horizontal or operating position.
Figure 22:
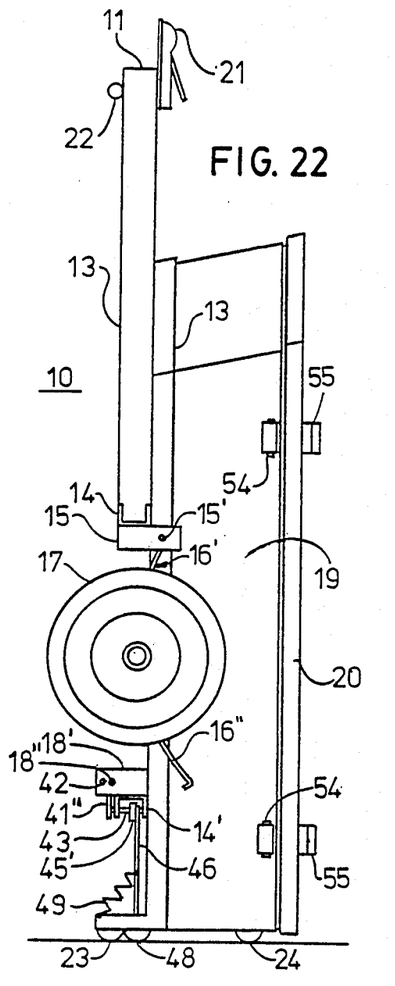
FIG. 22 is a side elevation view of the trailer of FIG. 20 in a vertical or storing position.

Referring to FIGS. 20, 21 and 22, another embodiment of the invention is illustrated, with a leaf spring suspension assembly. The suspension assembly to the left side of the page is shown exploded for the purpose of clarity in FIG. 20.

A pair of leaf springs 16', which may be multi-leaf springs, are pinned at one end of each by means of pins 15'. Pins 15' are retained within brackets 15 which are preferably welded to opposite sides of the frame. While the pins 15 may be located below the frame, it is preferred that they should be located outward of both sides of the frame and above the bottom of the frame. Thus the springs, which extend along the trailer in a front to back orientation are located alongside the sides of the trailer.

Wheels 17 which are located outside the springs are connected by means of an axle 17'. The axle is clamped to the springs in a conventional manner (not shown).

The other ends of the springs 16' are preferably bent downwardly and are held within a locking means. Preferably the locking means are comprised of pins 42 and 18', the bent portion 16" of the springs being held between them. The pairs of pins are retained by brackets 18, which are preferably welded to a cross member 14' welded to the frame rearwardly of the axle and wheels.

The upper pins 18' are removable from the brackets 18 in order to release the springs. Once they are removed, e.g. when the trailer is in its vertical storage position resting on its rear, the springs 16' may be swivelled about pins 15', the axle 17' being moved toward and eventually in contact with the bottom of the frame.

In this Position the wheels 17 overlap the sides of the frame, presenting a substantially narrowed side profile for the trailer and thus reducing the amount of storage space required.

It should be noted that if care is taken to avoid the affects of twisting torque on the springs, such as by using a robust multi-leafed spring and robust anchoring points, the wheels can be fastened to short separated wheel axles connected to the spring, avoiding the requirement for an axle passing under the trailer. In this case the springs and wheels can be swung far over alongside the trailer, further reducing the required storage space.

In order to release the pins 18', cranks comprised of levers 45' and 41" are connected via crankshafts 43' between the ends of each pushrods 46 and the ends of pins 18'. The pushrods are urged into their extended positions, by which the spring locking pins 18' are located in place within brackets 18, by means of springs 49 which extend between the pushrods 46 and the rear of the frame.

When the trailer is placed on its end, pushrods 46 are pushed so as to overcome the spring 49 tension, rotating the cranks and pulling pins 18' out of position, thus releasing the ends of the springs 16', and allowing the springs and attached wheels to rotate about pins 15' and move alongside the trailer sides.

When moving the trailer off its end, the springs 15' are rotated into their extended positions manually or by means of gravity, and once the trailer weight is released from the pushrods, the spring 49 tension causes rotation of the crank so as to replace the locking pins 18', into their positions in bracket 18 thus securing the ends of the springs 16'.

Figure 23:
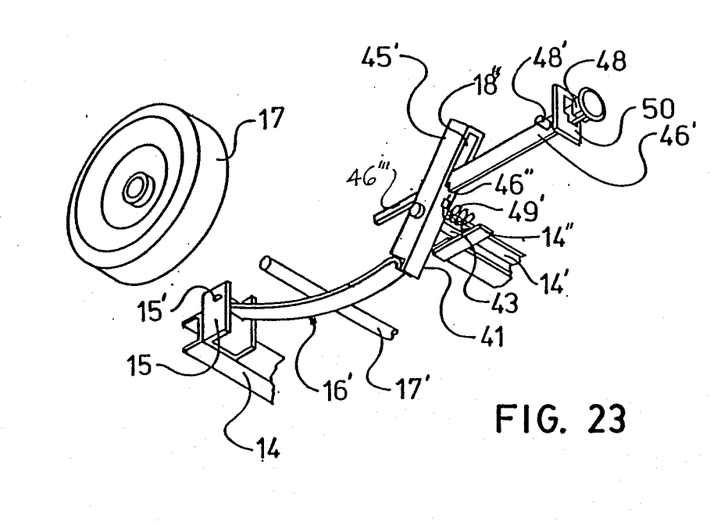
FIG. 23 is a fragmentary bottom perspective view of a third embodiment of the suspension support of the trailer with the leaf spring suspension assembly.

FIG. 23 illustates another embodiment of the invention. In this embodiment the springs 16' are retained and rotated about pins 15' in a manner similar to that described with reference to FIGS. 20-22. However the spring locking means at the other side of each spring is comprised of a notch in a crank 41, which is pinned to rotate about a horizontal axis. The crank 45' contains an elongated slot 18" through which pushrod 46' extends. The pushrod has a narrowed forward portion, adjoining a wider rear portion at a ledge 46". The crank is urged to its normal position supporting the end of spring 16', whereby the wheels are extended, by means of spring 49' which is connected between the upper portion of the crank and the frame.

In operation, with the wheels in extended position, the end of spring 16' is retained within the end notch of crank 41. Weight of the trailer is applied via the frame, crank pin and crank to the end of the spring 16', from which it is transferred to the axle 17' and the wheel 17 (the other side of the trailer having a similar structure and function).

When the trailer is up-ended to stand on its end, the pushrod 46' advances by contact with the ground causing the step 46" to engage the bottom of slot 18". This causes rotation of the crank, releasing the end of spring 16'. Each spring is thus released and may rotate about pin 15', causing the axle 17' and wheels 17 to move toward the top of the trailer, thus reducing its side profile. Alternatively the end of spring 16' may also move the end 46'" of pushrod 46' to disengage the ledge 46'" from the end of slot 18", thus reducing the tension in spring 49'.

As the trailer is moved off the ends of pushrod 46', the springs 16' rotate about pins 15'. With spring 16' in its lowermost position and pushrod 46' having lost contact with the ground, crank 41 moves to a position to support spring 16' in the end notch of crank 41". Alternatively the ends of spring 16' rotate the cranks 41 against the tension of the spring 49' as springs 16' move downward. When springs 16' reach their lowermost position, cranks 41 being forced by springs 49' snap into position such that springs 16' engage with the notch in cranks 41.

When the trailer is moved off its end, pushrod 46' loosens. As the trailer is rotated further towards its horizontal position, pushrods 46' are pulled by gravity to engage the ledge 46" with the end of slot 18". Alternatively once the trailer stands on its wheels, pushrods 46' may be pulled out in order to engage the ledge 46" with the end of the slot 18".

It should be noted that each pushrod 46' contains a stop 48' to limit its rearward movement. It also contains stops 48 which engage the sides of a slot in a panel or in the frame of the trailer, so that it could not move inadvertently forward and cause disengagement of the end of the springs.

Figure 24:
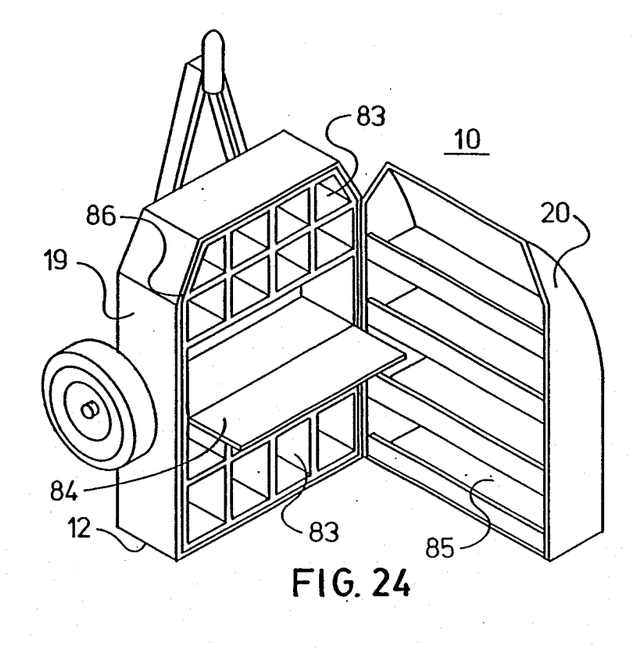
FIG. 24 is a top perspective view of the trailer with inserts for use as a portable kitchen or other work facility.

Turning now to FIG. 24 another embodiment of the invention is shown. In FIG. 24 an insert 86 is illustrated which fits into the trailer container. The insert is preferably a preformed structure which will provide horizontal shelves when the trailer is in its storage location. The shelves may contain a hinged folding work surface 84. Thus the trailer may form for example a work bench when in its stored position.

The insert may also include storage bins which would hold small objects, and form the horizontal shelves when the trailer is in the vertical position. When the trailer is in the horizontal position the bins form divided containers. When travelling with the insert in position it serves to retain objects in position.

As indicated earlier the trailer may also include a top unit 20 formed of sides and a roof. Preferably shelves 85 extend between the sides of the top unit and its roof, which are horizontal when the roof is open and the trailer is end down. The shelves may also contain uprights at their front edges which help to secure objects, particularly when travelling. The top unit can be closed at the front by a net.

Should the top unit 20 be hinged to the trailer at one side, once the trailer is standing on its end it may be opened into the form shown in FIG. 24, forming a very convenient and useful working and storage arrangement.

It will be apparent to those skilled in the art to which this specification is addressed that the embodiments heretofore described may be varied to meet particular specialized requiremenets without departing from the true spirit and scope of the invention disclosed. For example, the frame 13 may form an integral part of the container bottom 19. The foregoing embodiments are therefore not to be taken as indicative of the limits of the invention but rather as exemplary structures of the invention which is described by the claims appended hereto.

I claim:

1. A vertically storable trailer comprising, in combination:

frame means for supportably carrying a load, including attachment means connectable to a trailer hitch of a towing vehicle;

container means having a bottom portion mounted on the frame means for receiving the load and a top opposite the bottom portion, the bottom portion thereof having an end wall adapted to vertically support the trailer in a stored position to reduce trailer storage space;

wheel suspension means pendulously attached to the frame means adjacent the bottom portion;

wheel means rotably fastened to the suspension means;

suspension support means attached to the frame means adjacent the bottom portion in releasably engageable relation with the suspension means for locking same in an operable position to provide ground engagement of the wheel means with a predetermined road clearance and releasing the locked suspension means in the vertically supported position, whereby the wheel means can swing toward the top of the trailer to minimize trailer storage space, and means for engaging the ground coupled to the suspension support means for automatically unlocking the suspension means when the trailer is in the vertically supported position.

2. A trailer as claimed in claim 1 further comprising impelling means for urging the support means into locking relation with the suspension means to maintain the operable position thereof.

3. A trailer as claimed in claim 2 in which the engaging means is comprised of a displaceable pushrod having one end operably joined to the support means, the pushrod extending longitudinally therefrom with a free end Protruding rearwardly of the end wall for ground engagement when the trailer is tilted vertically to the stored position, whereby displacement of the pushrod overcomes the urging force of the impelling means, releasing the locked suspension means and permitting same to pendulate to a vertical position.

4. A trailer as claimed in claim 3 further comprising a plurality of resilient storing supports fixedly mounted on the end wall and protruding rearwardly therefrom to support the trailer in a vertically stored position.

5. A trailer as claimed in claim 4 wherein the wheel suspension means comprise:

a pair of tubes;

a pivot shaft fixedly attached to a side wall of each tube adjacent one end thereof;

a pivot housing mounted on the frame means adjacent either side of the bottom portion, each housing being adapted to mate with a corresponding shaft to produce a compact pivotal connection;

a load sustaining unit disposed within the tube at the other end thereof, the unit including a shock-absorbing suspension arm having one end attached to a side wall within the tube and a free end extending from the tube for releasable engagement with the support means; and a wheel axle fixedly attached to a side wall of each tube adjacent the rearward most end thereof.

6. A trailer as claimed in claim 5 further including a top portion lockable to the bottom portion for securely enclosing the load, wherein container bottom and top portions have outwardly sloping forward and side walls for nestably storing the top Portion in an inverted position within the bottom portion, with the supporting end wall facing rearwardly and being substantially flat and orthogonal to the frame to facilitate storing the trailer on the storing supports.

7. A trailer as claimed in claim 6 wherein the frame means comprises a triangular frame and the trailer further comprises a rod fixedly attached at the forward apex of the frame to function as a handle for manually lifting the forward end of the trailer from a horizontal, operating position to the vertical, storing position.

8. A trailer as claimed in claim 5 further comprising a bearing mounted on the end wall in alignment with each pushrod, each bearing having an aperture therethrough for slidably guiding a corresponding pushrod and a notch in the periphery of the aperture for engaging a stepped decrease in cross-section of the pushrod proximate the free end thereof to lock the pushrod and prevent accidental release of the support means for operable engagement with the suspension means.

9. A trailer as claimed in claim 8 wherein the pivot shaft extends outwardly on opposite side walls of the tube and the pivot housing comprises a pair of spaced apart, upstanding plates fixedly attached to a frame extension, the plates being apertured to provide pivotal bearing surfaces for the pivot shaft ends.

10. A trailer as claimed in claim 6 further comprising a pair of hinges mounted in Spaced relation on one side wall of the top and bottom portions of the container means, each hinge comprising a hinge housing affixed to the top portion, the housing being open on one side of a hollow, generally cylindrical body and a hinge pivot shaft affixed to the bottom portion for engageably disconnectable contact with the housing.

11. A trailer as claimed in claim 9 wherein the free end of the shock-absorbing suspension arm terminates in a bearing having a rearwardly facing curvilinear surface.

12. A trailer as claimed in claim 9 wherein the free end of the shock-absorbing suspension arm terminates in a generally flat, planar portion and the support means includes a supporting end having a flexible bearing for contacting the planar portion.

13. A trailer as claimed in claim 12 wherein the flexible bearing comprises a resilient L-shaped block bonded to the supporting end on one side and to an L-shaped striker plate on the other side.

14. A trailer as claimed in claim 11, 12 or 13 wherein the attached end of the arm comprises:
a shaft fixed to the tube add crossing therethrough via an aperture in the arm; and
a thick-walled resilient bushing concentrically disposed intermediate the fixed shaft and the peripheral surface of the aperture in the arm, whereby the free end of the suspension arm is restrained from rotary movement by torsional resistive forces within the bushing.

15. A trailer as claimed in claim 11, 12 or 13 wherein the arm comprises a flat, single leaf, cantilever spring with the attached end fixed to a side wall within the tube by a pair of retaining plates and having at least one resilient cushion disposed intermediate the spring and a side wall of the tube.

16. A trailer as claimed in claim 11, 12 or 13 wherein the arm comprises a multileaf, cantilever spring with the attached end affixed to a side wall within the tube by a pair of retaining plates.

17. A trailer as claimed in claim 11, 12 or 13 wherein the attached end of the arm comprises:
A pair of thin, circular resilient sections between which the attached end is sandwiched;
a torsion plate overlying each section;
a thrust bolt providing lateral compression of the sections via concentric apertures in the arm, sections and plates; and
means for fixedly securing the plates interiorly of the tube.

18. A trailer as claimed in claim 11 wherein the support means includes a curvilinear supporting end that is releasably coupled to the bearing in which the suspension arm terminates.

19. A trailer as claimed in claim 11, 12 or 13 wherein the impelling means comprises a coil spring connected intermediate the pushrod and the supporting end wall.

20. A trailer as claimed in claim 18 wherein the support means comprises:
a bracket fixedly attached to an extension of a rearward member of the frame;
a channel member pivotally attached to the bracket, the channel member having an L-shaped forward extension at one end; and
a cylindrical, bearing shaft fixedly attached to a free edge of the forward extension to define the curvilinear supporting end.

21. A trailer as claimed in claim 20 wherein the pushrod is pivotally joined to the other end of the channel member.

22. A trailer as claimed in claim 12 wherein the support means comprises:
a bracket fixedly attached to an extension of a rearward member of the frame; and
a channel member pivotally attached to the bracket.

23. A trailer as claimed in claim 12 wherein the support means comprises:
a bracket fixedly attached to an extension of a rearward member of the frame; and
a channel member pivotally attached to the bracket.

24. A trailer as claimed in claim 23 wherein the pushrod is pivotally joined to one end of the channel member and the free end of the channel member comprises the supporting end to which the L-shaped block and striker plate are bonded.

25. A trailer as claimed in claim 2 in which the wheel suspension means is comprised of a pair of leaf springs having first ends rotatably pinned at opposite sides of the frame means, and extending in a front to rear direction, each having its other end releasably locked to the frame means, a pair of wheels at opposite sides of the frame, and an axle joining the wheels fixed to the springs, whereby upon release of the locked ends of the springs they are enabled to swing about their pinned ends, allowing movement of the axle toward the bottom of the frame means and the retraction of the wheels from a fully extended position.

26. A trailer as defined in claim 25 in which the suspension support means and the spring means are located outside the sides of the frame.

27. A trailer as defined in claim 26 in which the suspension support means at which the springs are pinned are located above the bottom surface of the frame means.

28. A trailer as defined in claim 25, 26 or 27 in which the engaging means is comprised of a displaceable pushrod having one end operably joined to the support means, the pushrod extending longitudinally therefrom with a free end protruding rearwardly of the end wall for ground engagement when the trailer is tilted vertically to the stored position, each of said other ends of the springs being held between a pair of pins, one of each pair being displaceable in order to allow the spring to rotate toward the top of the trailer, and crank means interconnected between the end of the pushrod and a displaceable pin for displacing the displaceable pin when the pushrod is displaced, whereby displacement of the pushrod overcomes the urging force of the impelling means, releasing the lock suspension means and permitting same to pendulate to a vertical position.

29. A trailer as defined in claim 25, 26 or 27 in which the engaging means is comprised of a pair of displaceable pushrods each having one end operably joined to the support means, the pushrods extending longitudinally therefrom with free ends protruding rearwardly of the end wall for ground engagement when the trailer is tilted vertically to the stored position, each of said other ends of the springs being held between a pair of pins, one of each pair being displaceable in order to allow the spring to rotate toward the bottom of the frame means, and crank means interconnected between the ends of the pushrods and corresponding ones of the displaceable pins for displacing the displaceable pins when the pushrods are displaced, whereby displacement of the pushrods overcomes the urging force of the impelling means, releasing the locked suspension means and permitting same to pendulate to a vertical position.

30. A trailer as defined in claim 25, 26 or 27 in which the engaging means is comprised of a pair of displaceable pushrods each having one end operably joined to the support means, the pushrods extending longitudinally therefrom with free ends protruding rearwardly of the end wall for ground engagement when the trailer is tilted vertically to the stored position, cranks horizontally pinned relative to the frame means, each having a first lower notched end and a longitudinal slot in the portion thereof above its point of pinning, on each side of the frame means, said other ends of the spring being supported within a notch of a corresponding crank, the free end of each pushrod extending through the slot of a corresponding crank, each pushrod being stepped in width whereby the edge of the step can catch the end of the corresponding slot through which it extends during displacement of the pushrod to rotate the crank, releasing said other end of the spring from its notch, whereby displacement of the pushrods overcomes the urging force of the impelling means, releasing the locked suspension means and permitting same to pendulate to a vertical position.

31. A trailer as defined in claim 1, further including a trailer insert forming a shelving unit therewith having horizontal shelves when the trailer is in its vertically supported position.

32. A trailer as defined in claim 1, 25 or 31 further including a top unit being at least partly detachable for covering the trailer, having sides for extending from the sides of the trailer and a roof, and having shelves extending from one side to the other and to the roof, the shelves being horizontal when the trailer and roof are in their vertically supported position.

33. A trailer as defined in claim 25 or 31 further including a top unit being at least partly detachable for covering the trailer, having sides for extending from the sides of the trailer and a roof, and having shelves extending from one side to the other and to the roof, the shelves being horizontal when the trailer and roof are in their vertically supported position, the top unit being nestable within the container means of the trailer.

* * * * *